US012670695B2

(12) United States Patent
Gopalkrishna et al.

(10) Patent No.: US 12,670,695 B2
(45) Date of Patent: Jun. 30, 2026

(54) CONDITIONAL SIMILARITY-BASED IMAGE IDENTIFICATION AND MATCHING WITH REDUCED LABELS

(71) Applicant: NEC Laboratories America, Inc., Princeton, NJ (US)

(72) Inventors: Vijay Kumar Baikampady Gopalkrishna, Santa Clara, CA (US); Samuel Schulter, Long Island City, NY (US); Xiang Yu, Mountain View, CA (US); Manmohan Chandraker, Santa Clara, CA (US)

(73) Assignee: NEC Corporation, Tokyo (JP)

( * ) Notice: Subject to any disclaimer, the term of this patent is extended or adjusted under 35 U.S.C. 154(b) by 286 days.

(21) Appl. No.: 18/639,534

(22) Filed: Apr. 18, 2024

(65) Prior Publication Data

US 2024/0355090 A1     Oct. 24, 2024

Related U.S. Application Data

(60) Provisional application No. 63/460,942, filed on Apr. 21, 2023, provisional application No. 63/467,639, filed on May 19, 2023.

(51) Int. Cl.
*G06V 10/774*        (2022.01)
*G06F 16/532*        (2019.01)
(Continued)

(52) U.S. Cl.
CPC .......... *G06V 10/761* (2022.01); *G06F 16/532* (2019.01); *G06V 10/774* (2022.01);
(Continued)

(58) Field of Classification Search
None
See application file for complete search history.

(56) References Cited

U.S. PATENT DOCUMENTS

2024/0203085 A1*   6/2024   Bangalath ............. G06T 1/0021

OTHER PUBLICATIONS

Zhou, K., Yang, J., Loy, C. C., & Liu, Z. (2022, October 6). Learning to prompt for vision-language models. International Journal of Computer Vision, 130(9), 2337-2348.
(Continued)

*Primary Examiner* — Idowu O Osifade
(74) *Attorney, Agent, or Firm* — Vincent Duffy

(57)        ABSTRACT

Systems and methods are provided for matching one or more images using conditional similarity pseudo-labels, including analyzing an unlabeled dataset of images, accessing a foundational vision-language model trained on a plurality of image-text pairs, and defining a set of attributes each comprising multiple possible values for generating pseudo-labels based on notions of similarity (NoS). Text prompts are generated for each attribute value using a prompt template and encoding the text prompts using a text encoder of the foundational model. Each image in the dataset of images is processed through a vision encoder of the foundational model to obtain visual features, the visual features are compared against encoded text prompts to assign a pseudo-label for each attribute for each image, and a conditional similarity network (CSN) is trained with the pseudo-labeled images to generate a conditional similarity model.

20 Claims, 8 Drawing Sheets

(51) Int. Cl.
    *G06V 10/74*       (2022.01)
    *G06V 20/60*       (2022.01)
    *G06V 20/70*       (2022.01)
    *G06F 40/186*     (2020.01)

(52) U.S. Cl.
    CPC .............. *G06V 20/60* (2022.01); *G06V 20/70* (2022.01); *G06F 40/186* (2020.01)

(56) References Cited

OTHER PUBLICATIONS

Radford, A., Kim, J. W., Hallacy, C., Ramesh, A., Goh, G., Agarwal, S., . . . & Sutskever, I. (Jul. 18, 2021). Learning transferable visual models from natural language supervision. In International conference on machine learning (pp. 8748-8763). PMLR.
Veit, A., Belongie, S., & Karaletsos, T. (Jul. 21, 2017). Conditional similarity networks. In Proceedings of the IEEE conference on computer vision and pattern recognition (pp. 830-838).

* cited by examiner

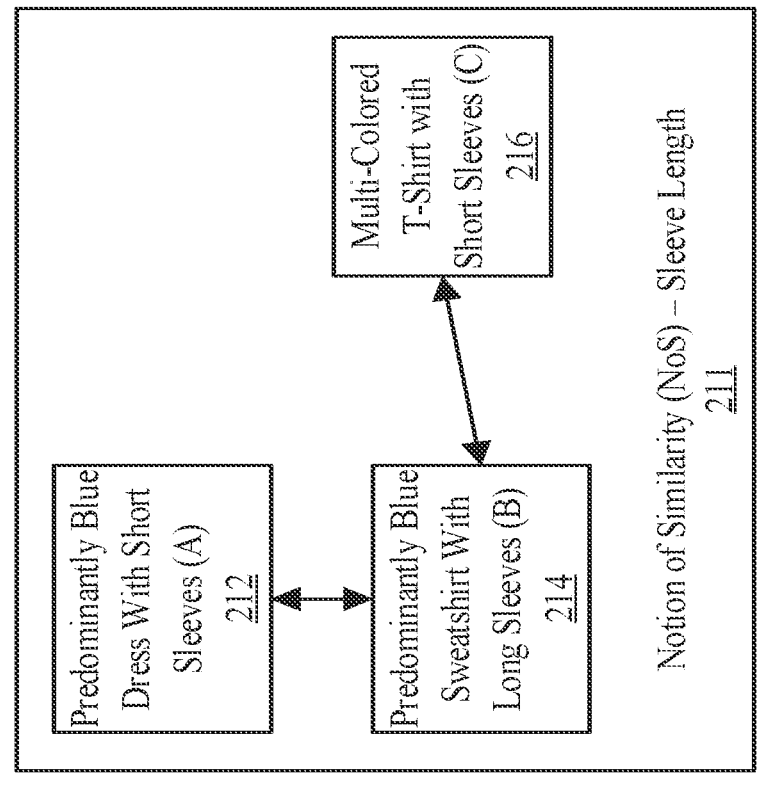
Notion of Similarity (NoS) – Sleeve Length
211
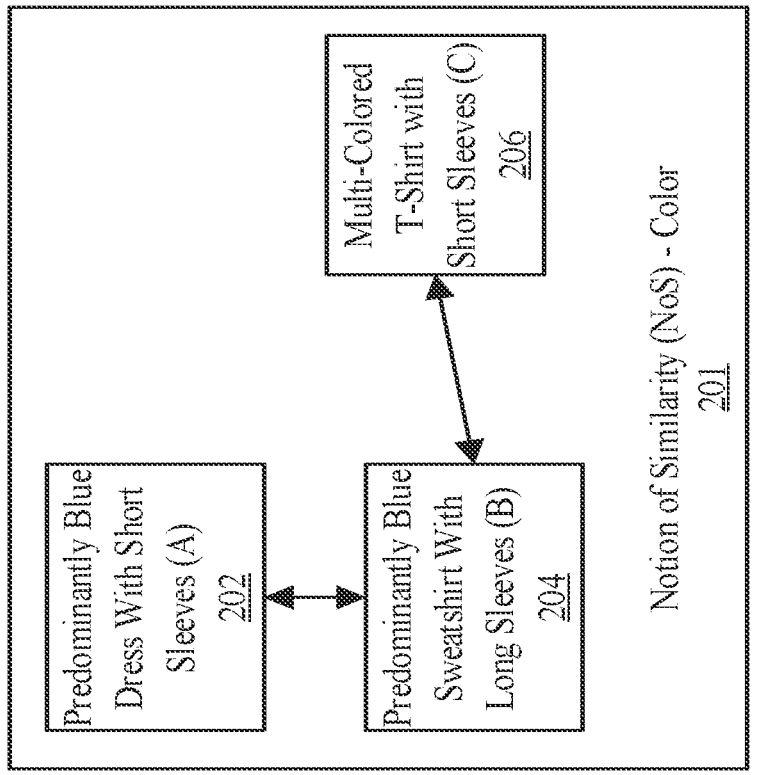
Notion of Similarity (NoS) – Color
201
200
FIG. 2

600
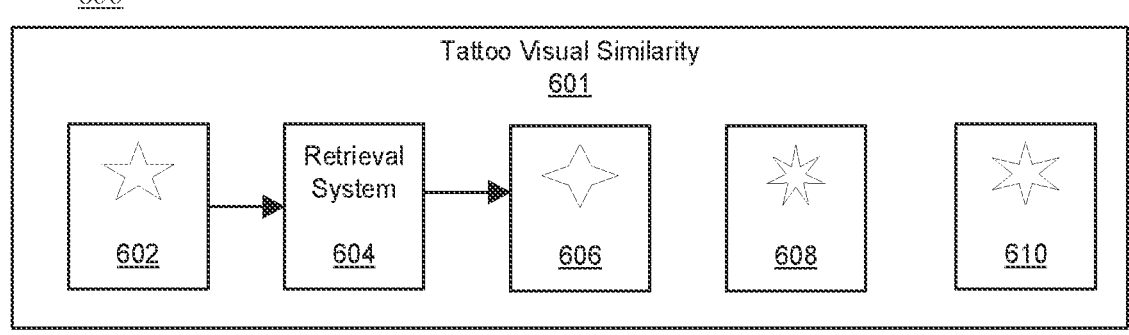
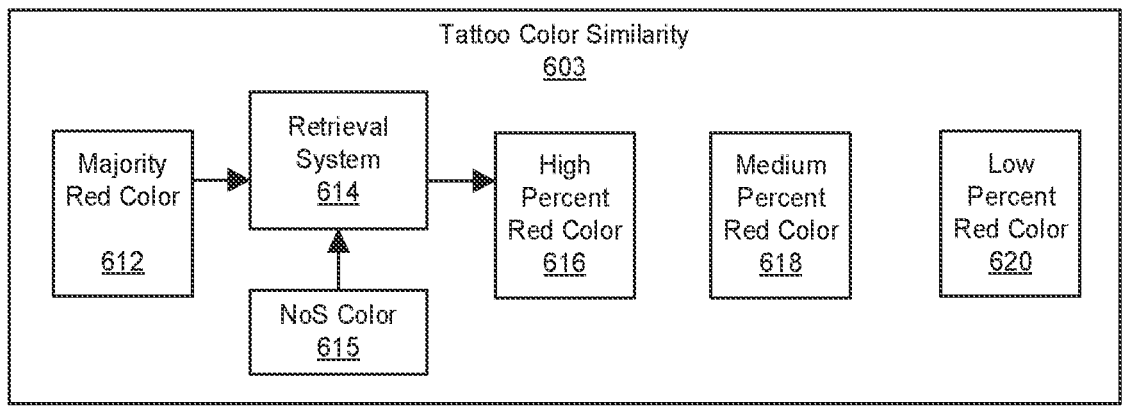
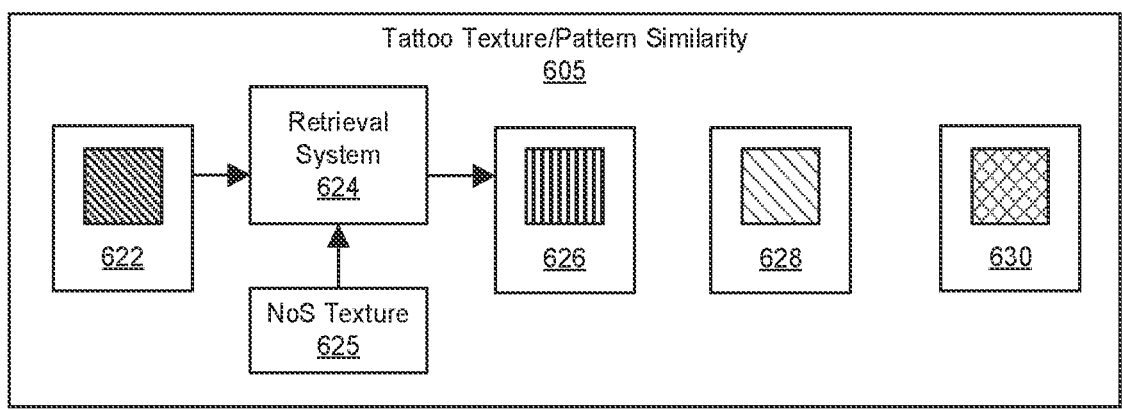
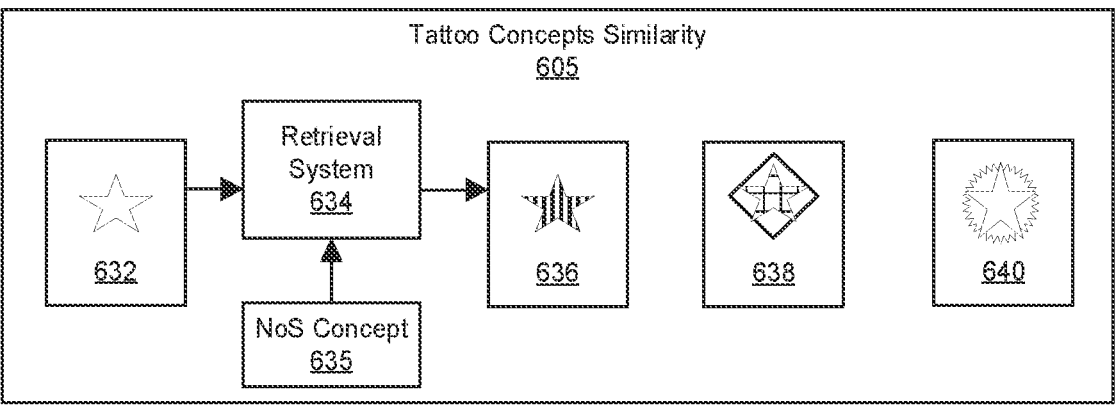
FIG. 6

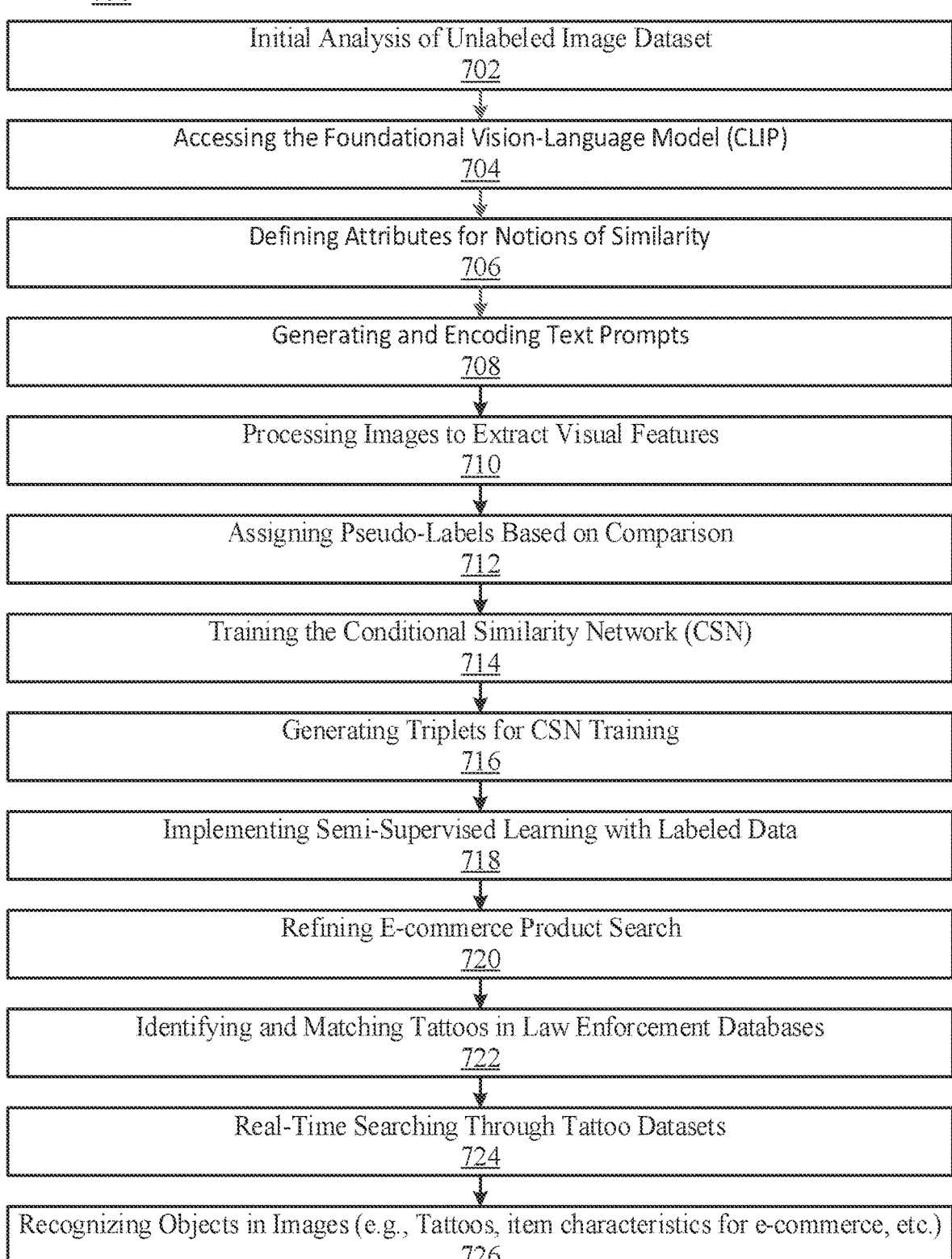

700

Initial Analysis of Unlabeled Image Dataset
702

Accessing the Foundational Vision-Language Model (CLIP)
704

Defining Attributes for Notions of Similarity
706

Generating and Encoding Text Prompts
708

Processing Images to Extract Visual Features
710

Assigning Pseudo-Labels Based on Comparison
712

Training the Conditional Similarity Network (CSN)
714

Generating Triplets for CSN Training
716

Implementing Semi-Supervised Learning with Labeled Data
718

Refining E-commerce Product Search
720

Identifying and Matching Tattoos in Law Enforcement Databases
722

Real-Time Searching Through Tattoo Datasets
724

Recognizing Objects in Images (e.g., Tattoos, item characteristics for e-commerce, etc.)
726

FIG. 7

CONDITIONAL SIMILARITY-BASED IMAGE IDENTIFICATION AND MATCHING WITH REDUCED LABELS

RELATED APPLICATION INFORMATION

This application claims priority to U.S. Provisional App. No. 63/467,639, filed on May 19, 2023, and U.S. Provisional App. No. 63/460,942, filed on Apr. 21, 2023, each incorporated herein by reference in its entirety.

BACKGROUND

Technical Field

The present invention relates to image processing and analysis using machine learning, and more particularly to an integrated system and method for enhancing image identification and matching through conditional similarity-based learning based on user-defined criteria.

Description of the Related Art

In the realm of digital image processing and analysis, traditional approaches have focused on leveraging visual features such as color, texture, and shape to facilitate image retrieval, identification, and matching. These methods are reliant on direct visual similarity, and thus face limitations when applied to scenarios requiring nuanced understanding and interpretation of images, such as distinguishing between contextually similar but visually disparate images. Existing systems struggle with accurately identifying and matching images based on abstract or conditional attributes, which are essential in various applications including, for example, e-commerce search engines and law enforcement databases. Moreover, the reliance on extensive labeled datasets for training poses significant challenges, including the demand for substantial human labor and the difficulty in obtaining specific annotations for rare or complex attributes. This underscores the need for innovative solutions capable of understanding and applying conditional similarities in image analysis without the constraints of conventional visual similarity metrics and extensive labeling requirements.

SUMMARY

According to an aspect of the present invention, a system is provided for identifying and matching, using a processor device operatively coupled to a computer readable medium, one or more images using conditional similarity pseudo-labels, including analyzing an unlabeled dataset of images, accessing a foundational vision-language model trained on a plurality of image-text pairs, and defining a set of attributes each comprising multiple possible values for generating pseudo-labels based on notions of similarity (NoS). Text prompts are generated for each attribute value using a prompt template and encoding the text prompts using a text encoder of the foundational model. Each image in the dataset of images is processed through a vision encoder of the foundational model to obtain visual features, the visual features are compared against encoded text prompts to assign a pseudo-label for each attribute for each image, and a conditional similarity network (CSN) is trained with the pseudo-labeled images to generate a conditional similarity model.

According to another aspect of the present invention, a method is provided for identifying and matching one or more images using conditional similarity pseudo-labels, including analyzing an unlabeled dataset of images, accessing a foundational vision-language model trained on a plurality of image-text pairs, and defining a set of attributes each comprising multiple possible values for generating pseudo-labels based on notions of similarity (NoS). Text prompts are generated for each attribute value using a prompt template and encoding the text prompts using a text encoder of the foundational model. Each image in the dataset of images is processed through a vision encoder of the foundational model to obtain visual features, the visual features are compared against encoded text prompts to assign a pseudo-label for each attribute for each image, and a conditional similarity network (CSN) is trained with the pseudo-labeled images to generate a conditional similarity model.

According to another aspect of the present invention, a non-transitory computer readable medium is provided for identifying and matching one or more images using conditional similarity pseudo-labels, including analyzing an unlabeled dataset of images, accessing a foundational vision-language model trained on a plurality of image-text pairs, and defining a set of attributes each comprising multiple possible values for generating pseudo-labels based on notions of similarity (NoS). Text prompts are generated for each attribute value using a prompt template and encoding the text prompts using a text encoder of the foundational model. Each image in the dataset of images is processed through a vision encoder of the foundational model to obtain visual features, the visual features are compared against encoded text prompts to assign a pseudo-label for each attribute for each image, and a conditional similarity network (CSN) is trained with the pseudo-labeled images to generate a conditional similarity model.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 2 is a diagram illustratively depicting a high-level view of an exemplary system and method for determining a Notion of Similarity (NoS) between objects based on specific conditions and criteria, in accordance with embodiments of the present invention;

FIG. 6 is a diagram illustratively depicting a method for determining conditional similarity between objects based on different types of Notion of Similarity (NoS) conditions and criteria, in accordance with embodiments of the present invention;

FIG. 7 is a block/flow diagram illustratively depicting a method for determining a Notion of Similarity (NoS) between objects based on specific conditions and criteria, in accordance with embodiments of the present invention.

DETAILED DESCRIPTION

Figure 1:
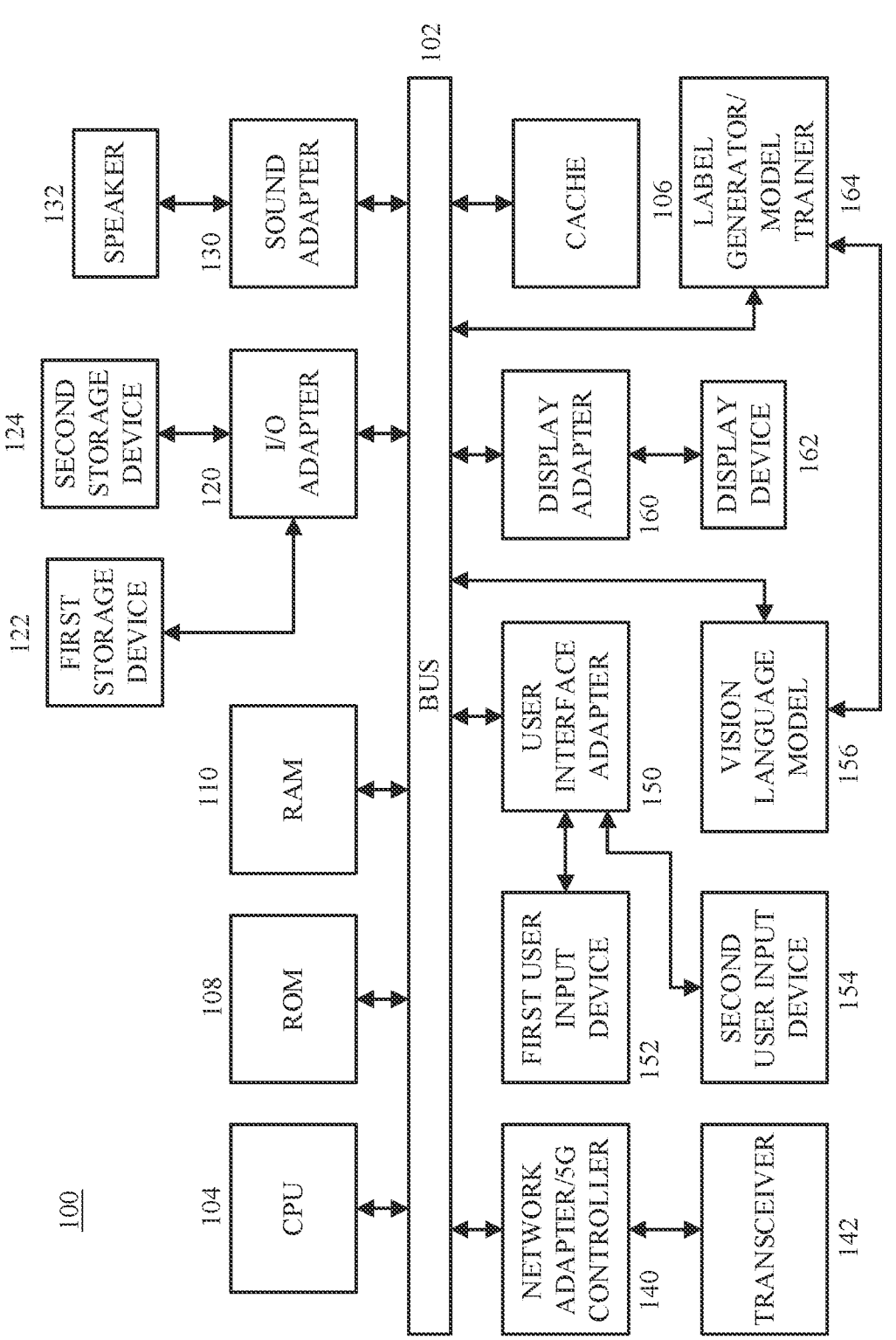
FIG. 1 is a block diagram illustratively depicting an exemplary processing system to which the present invention may be applied, in accordance with embodiments of the present invention.

In accordance with embodiments of the present invention, systems and methods are provided for identifying and matching images using conditional similarity pseudo-labels. This innovative approach leverages a foundational vision-language model, such as Contrastive Language-Image Pre-Training (CLIP), trained on a vast array of image-text pairs. By doing so, it bridges the gap between visual concepts and their linguistic counterparts, enabling a more nuanced and context-aware method for image analysis beyond traditional appearance-based features.

The present invention introduces a process for generating pseudo-labels for an unlabeled dataset of images, wherein the system defines a set of attributes encompassing multiple possible values to establish notions of similarity (NoS). These attributes, which may include color, texture, shape, and beyond, are used to generate text prompts through a specifically designed template. The prompts are encoded using the text encoder of the foundational model, and each image is processed through the model's vision encoder to extract visual features. By comparing these features against the encoded text prompts, the system assigns a pseudo-label for each attribute to every image, effectively training a Conditional Similarity Network (CSN) to recognize and apply these conditional similarities.

A notable aspect of this invention is its application in real-world scenarios, such as e-commerce and law enforcement. For e-commerce platforms, the conditional similarity model refines product search capabilities, enabling users to find products that align closely with their preferences based on user-defined attributes. In the context of law enforcement, particularly in tattoo recognition, the system offers a significant advancement by allowing for the identification and matching of tattoos based on customizable attributes related to specific symbols or meanings, thereby facilitating the search through comprehensive tattoo datasets for associations with gangs or criminal activities.

In various embodiments, the conditional similarity model benefits from both zero-shot and semi-supervised learning settings, demonstrating a substantial improvement in performance even when labeled data is scarce. By employing a semi-supervised learning approach with as little as 1% of labeled data, the system can fine-tune the generation of pseudo-labels, enhancing the overall accuracy and applicability of the conditional similarity model across various domains. The present invention encapsulates a sophisticated approach to image identification and matching, addressing the limitations of existing visual similarity methods by introducing a system and method capable of understanding and utilizing conditional similarities. This not only significantly reduces the need for extensive labeled datasets, which increases processing speed and reduces required network resources, but also opens new avenues for application in fields where nuanced image analysis is crucial, marking a considerable leap forward in the capabilities of image processing technologies, in accordance with aspects of the present invention.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Aspects of the present invention are described below with reference to flowchart illustrations and/or block diagrams of methods, systems, and computer program products according to embodiments of the present invention. It is noted that each block of the flowcharts and/or block diagrams, and combinations of blocks in the flowcharts and/or block diagrams, may be implemented by computer program instructions.

The flowchart and block diagrams in the figures illustrate the architecture, functionality, and operation of possible implementations of systems, methods, and computer program products according to various embodiments of the present invention. Each block in the flowchart or block diagrams may represent a module, segment, or portion of code, which comprises one or more executable instructions for implementing the specified logical function(s), and in some alternative implementations of the present invention, the functions noted in the block may occur out of the order noted in the figures. For example, two blocks shown in succession may, in fact, be executed substantially concurrently, may sometimes be executed in reverse order, or may be executed in any other order, depending on the functionality of a particular embodiment.

It is also noted that each block of the block diagrams and/or flowchart illustration, and combinations of blocks in the block diagrams and/or flowchart illustration, can be implemented by specific purpose hardware systems that perform the specific functions/acts, or combinations of special purpose hardware and computer instructions according to the present principles.

Referring now to the drawings in which like numerals represent the same or similar elements and initially to FIG. 1, an exemplary processing system 100, to which the present principles may be applied, is illustratively depicted in accordance with embodiments of the present principles.

In some embodiments, the processing system 100 can include at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid-state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160. One or more video cameras 156 can be further coupled to system bus 102 by any appropriate connection system or method (e.g., Wi-Fi, wired, network adapter, etc.), in accordance with aspects of the present invention.

A first user input device 152 and a second user input device 154 are operatively coupled to system bus 102 by user interface adapter 150. The user input devices 152, 154 can be one or more of any of a keyboard, a mouse, a keypad, an image capture device, a motion sensing device, a microphone, a device incorporating the functionality of at least two of the preceding devices, and so forth. One or more video cameras 156 can be included, and the video cameras can include one or more storage devices, communication/networking devices (e.g., WiFi, 4G, 5G, Wired connectivity), hardware processors, etc., in accordance with aspects of the present invention. In various embodiments, other types of input devices can also be used, while maintaining the spirit of the present principles. The user input devices 152, 154 can be the same type of user input device or different types of user input devices. The user input devices 152, 154 are used to input and output information to and from system 100, in accordance with aspects of the present invention. A vision language model 156 can process received input, and a label generator/model trainer 164 (e.g., neural network trainer) can be operatively connected to the system 100 for image analysis and matching, in accordance with aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Moreover, it is to be appreciated that systems 200, 300, 400, and 800, described below with respect to FIGS. 2, 3, 4, and 8, respectively, are systems for implementing respective embodiments of the present invention. Part or all of processing system 100 may be implemented in one or more of the elements of systems 200, 300, 400, and 800, in accordance with aspects of the present invention.

Further, it is to be appreciated that processing system 100 may perform at least part of the methods described herein including, for example, at least part of methods 200, 300, 400, 500, 600, and 700, described below with respect to FIGS. 2, 3, 4, 5, 6, and 7, respectively. Similarly, part or all of systems 200, 300, 400, and 800 may be used to perform at least part of methods 200, 300, 400, 500, 600, and 700 of FIGS. 2, 3, 4, 5, 6, and 7, respectively, in accordance with aspects of the present invention.

As employed herein, the term "hardware processor subsystem," "processor," or "hardware processor" can refer to a processor, memory, software, or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs). These and other variations of a hardware processor subsystem are also contemplated in accordance with embodiments of the present invention.

Referring now to FIG. 2, high-level view of an exemplary system and method 200 for determining a Notion of Similarity (NoS) between objects based on specific conditions and criteria is illustratively depicted in accordance with embodiments of the present invention.

In an illustrative embodiment, the system and method 200 can identify and match images using conditional similarity pseudo-labels, showcasing for ease of illustration two instances of Notions of Similarity (NoS), one for color and another for sleeve-length for garments. It is to be appreciated that although this example is directed to garments and two specific attributes, the present invention can be utilized for any types of images, items, or attributes of the images and items, in accordance with aspects of the present invention.

In various embodiments, block 201 describes the first instance of the system's capability to identify and match images based on the notion of similarity for color. It details the process of comparing images to determine a closer match in terms of color attributes. Block 202 represents the first image in the dataset, described as a predominantly blue dress with short sleeves, which serves as the reference point for similarity comparisons based on color. Block 204 depicts the second image in the dataset, which is a predominantly blue sweatshirt with long sleeves, illustrating the system's ability to differentiate based on color similarity despite the difference in sleeve-length. Block 206 shows the third image, a multi-colored t-shirt with short sleeves, demonstrating the system's process of assigning similarity pseudo-labels based on color, even when other attributes like pattern or sleeve-length vary, in accordance with aspects of the present invention.

Block 211 details a second example of a capability of the system and method 200 capability, focusing on sleeve-length as the criterion for similarity comparison, emphasizing the system's adaptability to any of a plurality of attributes. Block 212 reiterates the first image, Image A, as the reference for comparing sleeve-length similarities. Block 214 repeats the presence of Image B, the blue sweatshirt, to contrast the sleeve-length with Image A and Image C within the sleeve-length similarity context. Block 216 revisits Image C, where the system uses the sleeve-length attribute to ascertain similarity to Image A, regardless of the differences in color or pattern.

The system and method 200 can utilize a multifaceted approach to identifying and matching images using any of a plurality of notions of similarity. It demonstrates the system's robustness in handling different attributes independently, enabling precise image retrieval based on specific conditions or criteria defined by users or domain requirements, in accordance with aspects of the present invention.

In various embodiments, the determination of similarity based on conditional attributes (e.g., color and sleeve-length) can be conducted through a series of computational steps within the system. Initially, the system can define what attributes (Notions of Similarity, NoS) are most useful for the comparison. This can include color, texture, sleeve-length, or other relevant characteristics. For instance, the system might consider 'color' as a NoS for one type of comparison and 'sleeve-length' for another. Using a foundational vision-language model (e.g., CLIP), the system can generate pseudo-labels for each image in the dataset. It can use predefined text prompts associated with each attribute (e.g., "predominantly blue" for color, "short sleeves" for sleeve-length, etc.). The model can create text classifiers based on these prompts. Each image can be processed through a vision encoder to extract visual features. The features can be encoded in a way that aligns with the model's understanding of the attributes.

In an exemplary embodiment, for color, the system can compare the visual features of an image against the text classifier for "color." The comparison yields a similarity score, which indicates how closely the image's color matches the defined color classes. For sleeve-length, the system can assess the features against the "sleeve-length" classifier. The score from this comparison reflects the similarity in sleeve-length relative to the defined classes (e.g., short, medium, long, etc.). The system can calculate distances (e.g., similarity scores) between images based on the encoded features and the pseudo-label classifiers, where a lower distance indicates a higher similarity.

For example, if Image A is a predominantly blue dress with short sleeves, and Image B is a predominantly blue sweatshirt with long sleeves, their color similarity may be high, but their sleeve-length similarity will be low. Image C, if it is a multi-colored t-shirt with short sleeves, might have a lower color similarity to Image A but a higher sleeve-length similarity. Finally, the system can rank the images based on the calculated similarities. In some embodiments, for a query image, the system can retrieve and display other images from the dataset that are most similar according to the specified Notion of Similarity. This systematic approach enables the identification and retrieval of images not just based on visual similarity but conditional similarity that takes into account specific attributes relevant to the user's requirements, such as in e-commerce settings for garment search or law enforcement for tattoo matching, in accordance with aspects of the present invention.

Figure 3:
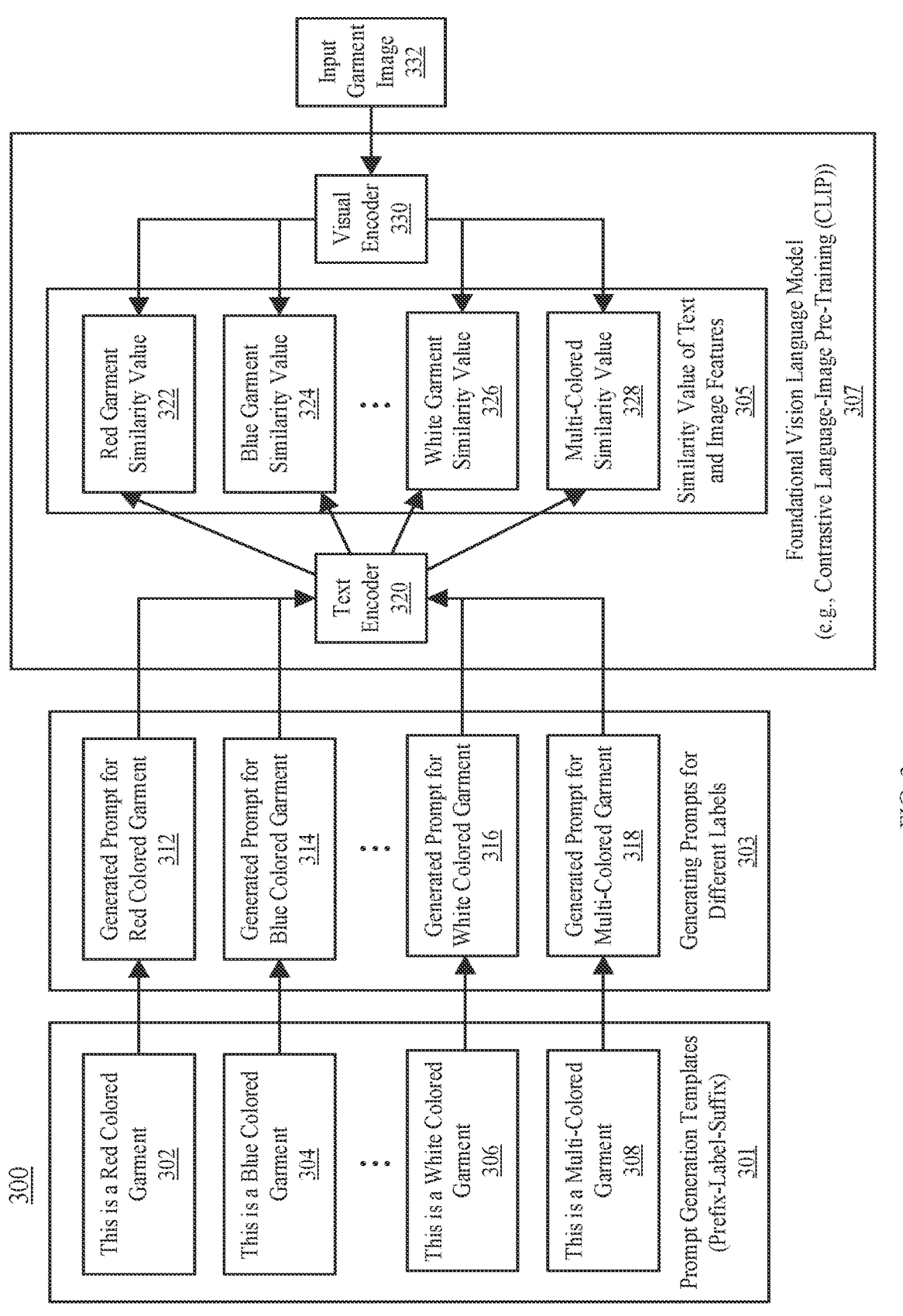
FIG. 3 is a diagram illustratively depicting a system and method for generating pseudo labels for one or more images for determining conditional similarity between objects, in accordance with embodiments of the present invention.

Referring now to FIG. 3, a diagram showing a system and method 300 for generating pseudo labels for one or more images for determining conditional similarity between objects is illustratively depicted in accordance with embodiments of the present invention.

In various embodiments, the system and method 300 can identify and match images based on conditional similarity, presented as garment color attributes in this illustrative example. The system can leverage a foundational vision-language model (e.g., CLIP) to analyze the visual content of an image and match it with text-based descriptors of color attributes, thereby generating pseudo-labels that reflect these attributes. It is to be appreciated that although this example is directed to garment color attributes, the present invention can be utilized for any types of images, items, or attributes of the images and items, in accordance with aspects of the present invention.

Block 301 represents the initial stage where prompt generation templates can be created. In this illustrative embodiment, these templates configured for constructing text-based descriptors that correspond to potential color attributes of garments. Each template follows a standardized format with a prefix, color attribute label, and suffix, allowing for consistent prompt generation. Blocks 302, 304, 306, and 308 correspond to specific instances of text prompts that describe garments of red, blue, white, and multi-colored attributes, respectively. These text prompts are generated to represent the wide spectrum of color attributes that the system can recognize and differentiate between. Blocks 312, 314, 316, and 318 detail the generated prompts for red, blue, white, and multi-colored garments that emerge from the prompt generation templates. These prompts form the textual representation of the garment color attributes and are used to create a linguistic connection to the visual features of the garment images.

Block 320, the text encoder within the foundational vision-language model, can process these generated prompts. The encoder can transform the textual descriptors into a numerical format that can be quantitatively analyzed, generating encoded vectors that represent the linguistic aspects of color attributes. Block 330, the visual encoder, can operate in parallel to the text encoder. It processes an input garment image, represented by block 332, to extract visual features. These features can be encoded into a numerical vector, analogous to the process performed by the text encoder, enabling a direct comparison between the visual data and text data.

In various embodiments, block 305 is the computational engine where the similarity values between the encoded text and visual vectors are determined. For each color attribute, a similarity score can be computed, represented by Blocks 322 (red), 324 (blue), 326 (white), and 328 (multi-colored). These scores quantify the correspondence between the visual content of the garment image and the respective text-based color descriptors. Block 307 shows the foundational vision-language model's integration into the system, such as CLIP. This model underpins the system's capability to assess conditional similarity, enabling the comparison of high-dimensional vectors from both the text and visual domains.

In various embodiments, the textual descriptions of color attributes can be transformed/translated into a form that can be matched against the visual representation of the garments. The system can then identify which text-based color descriptor most closely aligns with the garment image, assigning an appropriate pseudo-label based on the highest similarity score. This process allows for a nuanced approach to image matching that goes beyond simple visual similarity, considering the conditional context in which similarity is defined, in accordance with aspects of the present invention.

The system and method 300 is an integrated solution for analyzing and matching images using the concept of conditional similarity, focusing in this illustrative example on color attributes for garments. Each block represents a specialized function within the system, and together they form a coherent process that begins with the creation of descriptive prompts and ends with the generation of similarity scores. These scores determine the closest match between the input image and a set of predefined attributes.

In various embodiments, at the start of the process, block 301 outlines the foundational step of prompt generation. Here, templates can be devised to form the basis of textual descriptors, with each template consisting of a prefix, a chosen color attribute as the label, and a suffix. These templates can be utilized for standardizing the language used to describe the attributes of the garments.

Blocks 302, 304, 306, and 308 provide specific examples of the prompts generated from these templates. They offer a linguistic representation of various color attributes (e.g., red, blue, white, and multi-colored), which the system can later use to compare against visual features extracted from the images. The generated prompts are then passed to block 320, the text encoder part of the foundational vision-language model, where they are converted into encoded text vectors. This process can include analyzing the semantics of the text prompts and transforming/translating them into a mathematical representation that the system can process in comparison with image data.

Concurrently, block 330, the visual encoder, can process the input image, represented by block 332, to extract and encode visual features into visual vectors. The visual encoder analyzes the image, breaking it down into features that can be numerically compared to the text vectors. In block 305, the encoded text and visual vectors can be compared to calculate similarity values. This comparison assesses how closely the visual features of the input image correspond to each textual descriptor of color. Blocks 322, 324, 326, and 328 correspond to the calculated similarity values for red, blue, white, and multi-colored garments, respectively. Each block can output a numerical score that quantifies the degree of similarity between the image and the color attribute described by the text prompts.

In various embodiments, an output of this process is a set of similarity scores that indicate which color attribute the input garment image most closely aligns with. For instance, if the system is trying to match an image of a blue garment, and the similarity value for blue (as outputted by block 324) is the highest, the system would then assign a pseudo-label of "blue" to that image, indicating that it has recognized the garment's color as blue. These scores represent the system's analysis and conclusions about the attributes of the garment in the image, which can be used to match, sort, or recommend products in various applications such as online retail or inventory management. The system and method 300 can effectively transform/translate linguistic concepts into visual analysis, thereby bridging the gap between descriptive language and image content, in accordance with aspects of the present invention.

Figure 4:
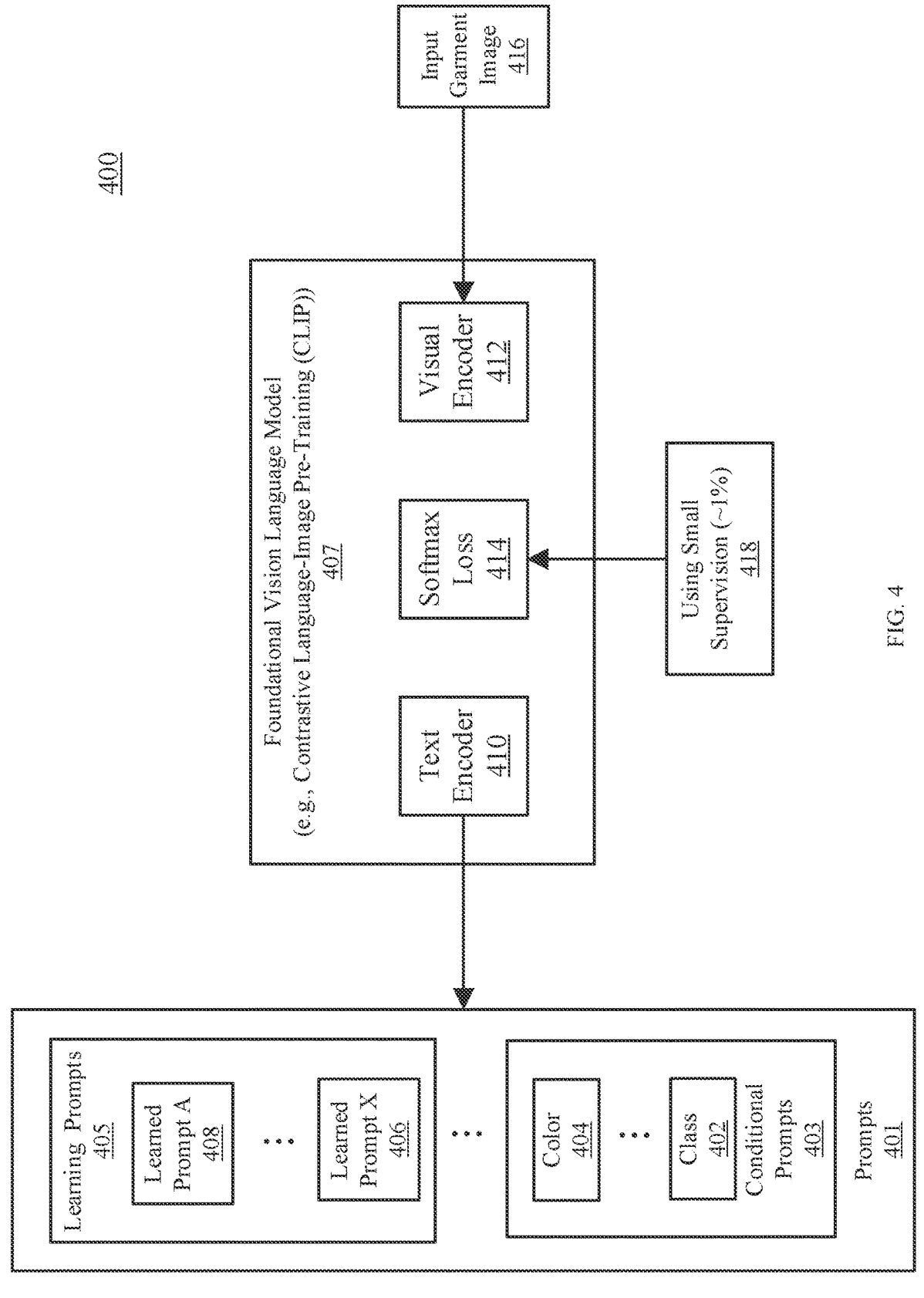
FIG. 4 is a diagram illustratively depicting a system and method for iteratively prompt tuning each attribute in a dataset for determining conditional similarity between objects, in accordance with embodiments of the present invention.

Referring now to FIG. 4, a diagram showing a system and method 400 for iteratively prompt tuning each attribute in a dataset for determining conditional similarity between objects, is illustratively depicted in accordance with embodiments of the present invention.

In various embodiments, the system and method 400 can accurately and efficiently perform image matching for any of a plurality of images or attribute types through the generation of tailored prompts that effectively communicate the attributes of interest for an input image using a semi-supervised learning framework within the realm of conditional similarity networks, in accordance with aspects of the present invention. The Prompts Subsystem includes blocks 401, 402, 403, 404, and 405, which collectively contribute to the learning of prompts based on a minimal amount of supervision.

Block 401, representing prompts, outlines the inception point where raw prompts are initially created. These prompts can be utilized to capture the nuances of various attributes, such as color and class, that can be applied to a dataset of garment images. The design of these prompts is configured for utilization for the subsequent training and learning processes to adhere to the desired attributes. Block 402 and 403 detail the hierarchical nature of the prompts. Block 402, named class, pertains to a broader categorization of attributes, while block 403, titled conditional prompts, narrows the focus to more specific conditions that are required to fine-tune the similarity network. Block 404 focuses on the example of an attribute of color, showcasing an instance of a specific attribute that is a critical component of the learned conditional prompts, noting that any of a plurality of attributes can be utilized in accordance with aspects of the present invention.

The Learning Prompts section, encapsulated by block 405, includes block 408 (Learned Prompt A) and block 406 (Learned Prompt X), representing a spectrum of refined prompts after the learning process. These blocks illustrate the evolution of prompts from a generic state to a more specialized one, refined through interaction with a minimal subset of labeled data. Block 407 represents the foundational vision-language model, such as CLIP, which can be utilized for processing of both textual and visual information. This model serves as the backbone for the operations of encoding and comparative analysis. The Encoding and Loss Calculation Subsystem includes block 410 (Text Encoder), block 414 (Softmax Loss), and block 412 (Visual Encoder), which function cohesively to process and compare textual and visual information.

In various embodiments, the text encoder 410, can transform learned prompts into a numerical format conducive to machine processing. This transformation encodes the semantics of the text into a high-dimensional vector space. The visual encoder 412 can operate in parallel with the text encoder and processes the input image 416 to extract pertinent visual features, also converting them into a comparable high-dimensional vector format. Softmax Loss 414 can include computing a discrepancy between the predicted attributes from the visual encoder and the actual labels derived from the prompts. The Softmax Loss function facilitates the backpropagation of errors to update the model during the semi-supervised learning process. Block 418, using small supervision (~1%), emphasizes the system's unique characteristic of being configured for utilizing only a small fraction of labeled data to effectively learn and refine the prompts. This feature shows the semi-supervised nature of the system, differentiating it from traditional fully supervised learning approaches, and further reduces processor requirements and increases speed of the system and method 400 by utilizing small supervision, in accordance with aspects of the present invention.

The system and method 400 can be utilized for conducting a process that begins with raw prompt generation based on a select few labeled examples. Through the text encoder, the system learns to articulate these prompts in a language understandable by the vision-language model. The visual encoder then extracts and encodes features from the input garment image, which are subsequently compared against the encoded prompts to evaluate their similarity. The Softmax Loss function computes the degree of error in these comparisons, enabling the system to learn and improve iteratively using minimal supervision. The output of the system can be a set of refined prompts that accurately reflect the visual attributes of the input images. These prompts can be used to match images with similar attributes, retrieve images based on specific conditions, or even generate recommendations for e-commerce platforms, effectively demonstrating the system's applicability in real-world scenarios where nuanced image matching is desired by end users, in accordance with aspects of the present invention.

Figure 5:
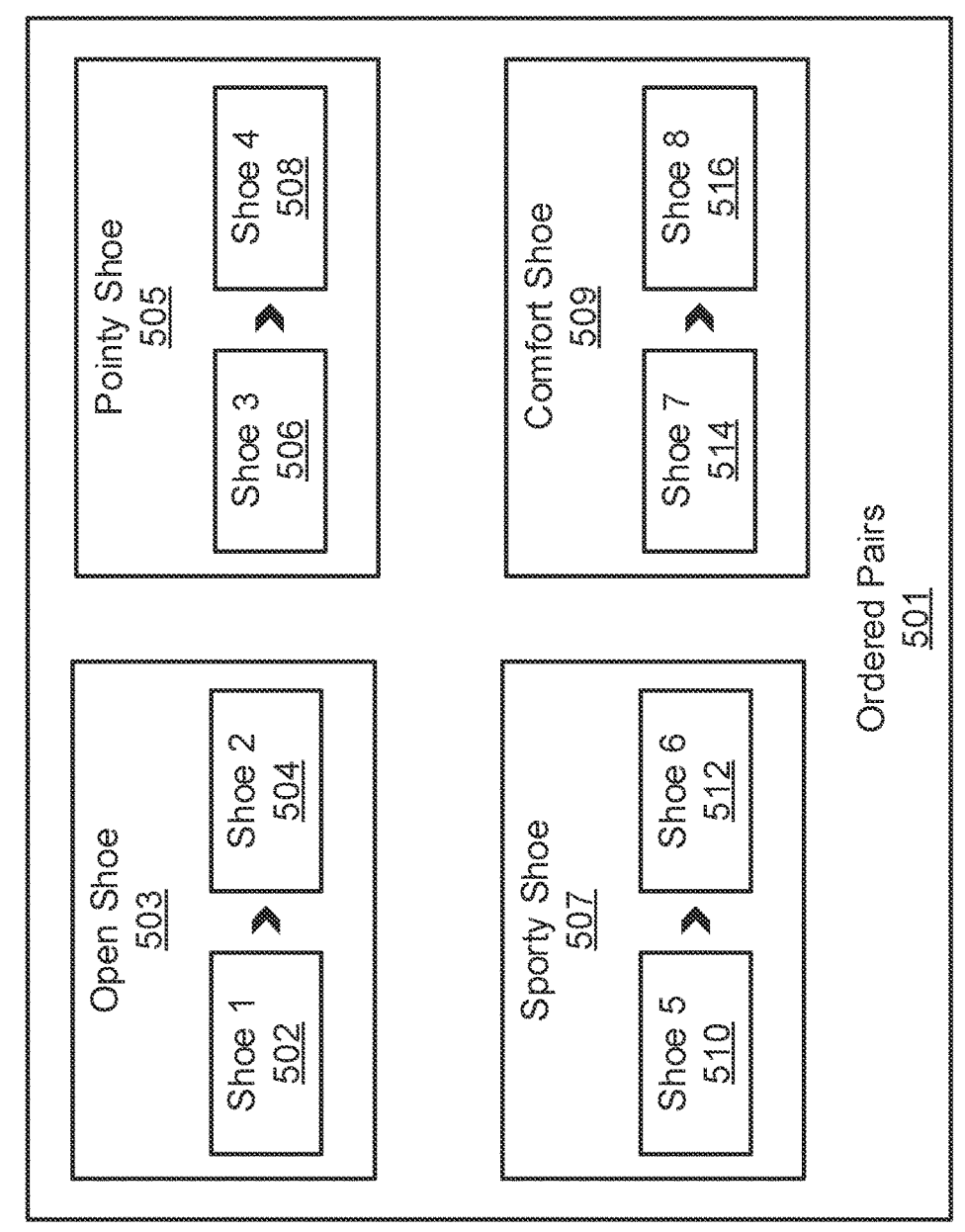
FIG. 5 is a diagram illustratively depicting a method for determining conditional similarity between objects based on a specific user-defined Notion of Similarity (NoS) conditions and criteria, in accordance with embodiments of the present invention.

Referring now to FIG. 5, a diagram showing a system and method 500 for determining conditional similarity between objects based on a specific user-defined Notion of Similarity (NoS) conditions and criteria is illustratively depicted in accordance with embodiments of the present invention.

In an illustrative, non-limiting embodiment, the system and method 500 can match images (e.g., different shoe types in this illustrative example) based on user-defined attributes, employing a method that significantly reduces the need for extensive labeled datasets, and thus can simplify the process of identifying and matching items according to conditional attributes, here exemplified by footwear. Block 501 indicates the 'Ordered Pairs' aspect that establishes the comparison basis between pairs of shoes. Each pair consists of two shoes that share a particular attribute that is subject to comparison, such as style or design features, but may differ in other aspects.

Blocks 502 and 504 represent the first ordered pair within the 'Open Shoe' category, denoted by block 503. This category might encompass shoes that have open tops, such as sandals or flip-flops. In this pair, Shoe 1 and Shoe 2 share the 'open' characteristic, but might differ in an amount of openness, color, brand, or other design specifics. Similarly, blocks 506 and 508 constitute the second ordered pair labeled under the 'Pointy Shoe' category, shown by block 505. This category could include shoes with pointy toes, which might be indicative of formal wear or a certain style like stilettos or oxfords. The third pair, depicted by blocks 510 and 512 and categorized under block 507 as 'Sporty Shoe', could represent athletic or casual footwear designed for sports or outdoor activities. Lastly, blocks 514 and 516 are grouped under the 'Comfort Shoe' category in block 509, potentially indicative of shoes designed for comfort over style, such as cushioned walking shoes or therapeutic footwear.

In various embodiments, each ordered pair demonstrates the system's capability to compare and match items based on a specific, user-defined Notion of Similarity (NoS), which might include, but is not limited to, aspects like openness, pointiness, sportiness, or comfort. This inventive solution can utilize a large foundational model (e.g., Vision-Language Model (VLM)), to generate pseudo-labels for these attributes. This would allow, for example, the comparison of 'Sporty Shoe' and 'Comfort Shoe' pairs not based on visual similarity alone but on the desired NoS, such as 'suitability for running' or 'arch support level', in accordance with aspects of the present invention.

In real-world practice, by examining relative similarities between different pairs, a user or the automated system can determine, for instance, that Shoe 1 is more open than Shoe 2, or Shoe 3 is pointier than Shoe 4, without requiring a fully labeled dataset for every possible attribute comparison. This simplifies, accelerates, and reduces the processing requirements of, for example, sorting, searching, and recommending products in e-commerce or other digital platforms, matching tattoos in a law enforcement database, etc., and, as it allows for flexible and nuanced definitions of similarity that go beyond mere appearance, accommodating a wide array of user preferences and functional requirements, in accordance with aspects of the present invention.

Referring now to FIG. 6, a block/flow diagram showing a method 600 for determining conditional similarity between objects based on different types of Notion of Similarity (NoS) conditions and criteria is illustratively depicted in accordance with embodiments of the present invention.

In various embodiments, FIG. 6 presents an exemplary layered visualization of how different categories of tattoo similarity (e.g., visual, color, texture/pattern, and conceptual) can be analyzed within a retrieval system that utilizes conditional similarity as a more nuanced measure than traditional visual similarity. Each category uses a distinct Notion of Similarity (NoS) to identify and match tattoos, noting that these categories are exemplary, and any category can be defined by a user in accordance with aspects of the present invention.

In this exemplary embodiment, within the Visual Similarity category, block 601, there is an example of a star tattoo, block 602, being processed by the retrieval system, block 604. The result is a series of tattoos, blocks 606, 608, and 610, that are visually similar to the original star tattoo. This process illustrates a basic form of similarity based on direct visual attributes. The Color Similarity category, block 603, delves deeper into the conditional aspects of similarity. Here, a tattoo with a majority red color, block 612, is entered into the retrieval system, block 614. The system categorizes tattoos based on the percentage of red color present, resulting in a high percentage red color tattoo, block 616, a medium percentage, block 618, and a low percentage, block 620. The category is guided by NoS color, block 615, indicating that color is the specific condition being evaluated for similarity, rather than overall appearance.

In the Texture/Pattern Similarity category, block 605, tattoos are matched based on shared texture or pattern elements. A striped tattoo, block 622, is analyzed by the retrieval system, block 624, to find other tattoos that, regardless of their imagery, share a striped texture, as shown in blocks 626, 628, and 630. This category operates under NoS texture, block 625, signifying the ability to utilize textural or patterned similarity in the retrieval process. In the Concepts Similarity category, block 605, the abstract level of similarity is illustrated. A star tattoo, block 632, is passed through the retrieval system, block 634, to find tattoos that share a similar underlying concept, such as celestial bodies, despite having different visual appearances. The resulting tattoos, blocks 636, 638, and 640, may look different but share the concept identified by NoS concept, block 635.

In each of these categories, the retrieval systems 604, 614, 624, 634 can utilize the underlying NoS to go beyond surface-level visual matches and identify tattoos (or any of a plurality of other items and images) that are contextually or conceptually similar based on specific, user-defined criteria. This nuanced approach can be utilize, for example, in law enforcement, where the meaning or connotation of a tattoo may be more relevant than its appearance. The ability to define and apply various notions of similarity enables a more targeted search and can help in investigations that require matching tattoos to potential gang affiliations or other relevant criminal contexts. This system reduces the reliance on extensive labeled datasets and provides a more sophisticated tool for tattoo identification and matching, in accordance with aspects of the present invention.

Referring now to FIG. 7, a block/flow diagram showing a method 700 for determining a Notion of Similarity (NoS) between objects based on specific conditions and criteria is illustratively depicted in accordance with embodiments of the present invention.

In various embodiments, in block 702, an initial analysis of an unlabeled dataset of images can be performed. This involves assessing the dataset's size, diversity, and complexity. Pre-processing steps are applied to normalize the images in terms of size, resolution, and color consistency to ensure uniformity across the dataset for effective processing. In block 704 a pre-trained foundational vision language model (e.g., Contrastive Language-Image Pre-Training (CLIP)), can be accessed and utilized. The system establishes a connection to the model, which has been trained on a large corpus of image-text pairs, enabling it to interpret images in the context of natural language. This model is important for translating visual features into language-based representations.

In block 706, the system defines a comprehensive set of attributes for generating pseudo-labels. This step includes specifying a wide range of attributes such as color, texture, shape, and more abstract qualities. The attributes are selected based on their relevance to the application domain (e.g., e-commerce, law enforcement), ensuring the system can generate meaningful pseudo-labels for various notions of similarity. Block 708 involves generating text prompts for each attribute value using a defined template (prefix, attribute value, suffix). The system utilizes natural language processing techniques to formulate prompts that accurately represent each attribute. These prompts are then encoded using the text encoder of the foundational model, translating them into a format that can be compared with visual features extracted from images.

In block 710, each image is processed through the vision encoder of the foundational model. Advanced image processing techniques are employed to extract key visual features from the images, which are encoded into a form that facilitates comparison with the encoded text prompts. This step is crucial for identifying the visual characteristics of each image that correspond to the defined attributes. Block 712 details the comparison of extracted visual features against the encoded text prompts. Machine learning algorithms are used to assess the similarity between the visual features of each image and the encoded prompts. The highest similarity scores are used to assign a pseudo-label for each attribute to each image, effectively categorizing the images based on the predefined notions of similarity.

In block 714, the pseudo-labeled images are used to train the Conditional Similarity Network (CSN). This involves feeding the images and their associated pseudo-labels into the CSN, which learns to identify and match images based on conditional similarity. The training process is optimized using techniques such as backpropagation and gradient descent to refine the CSN's accuracy in recognizing complex patterns of similarity. Block 716 elaborates on generating triplets from the pseudo-labeled images, a crucial step for training the CSN effectively. Triplets consist of an anchor image, a positive image (similar to the anchor), and a negative image (dissimilar to the anchor). This triplet formation is key to teaching the CSN the nuances of conditional similarity by providing clear examples of similar and dissimilar image pairs.

In block 718, a semi-supervised learning approach is applied by incorporating a small percentage (e.g., 1%) of labeled data into the training process. This step enhances the CSN's learning by introducing a degree of ground truth into the model, thereby improving its accuracy and robustness in identifying and matching images based on conditional similarity. Block 720 details the application of the conditional similarity model in refining product search capabilities on e-commerce platforms. The system integrates the model to analyze user queries and match products based on a rich understanding of user-defined attributes, thereby delivering highly relevant search results and recommendations.

In block 722, the system employs the conditional similarity model for tattoo recognition within law enforcement systems. This involves analyzing tattoos in a database to match them with descriptions or images of tattoos of interest based on user-defined notions of similarity, significantly aiding in criminal investigations. Block 724 expands on real-time searching through comprehensive law enforcement tattoo datasets. The system uses the conditional similarity model to quickly parse through vast datasets, identifying potential matches based on both visual and abstract attributes, streamlining the process of finding associations with gangs or criminal activities. In block 726, the system can recognize pictorial elements (e.g., tattoos, e-commerce item attributes, etc.) that share particular attributes, but differ in appearance by employing the conditional similarity model. This block highlights the system's ability to match object attributes (e.g., tattoos, clothing color, sleeve length, dresser height in e-commerce applications, etc.) based on customizable attributes specified by end-users, addressing the challenge of identifying conceptually similar tattoos with distinct visual representations, in accordance with aspects of the present invention.

Figure 8:
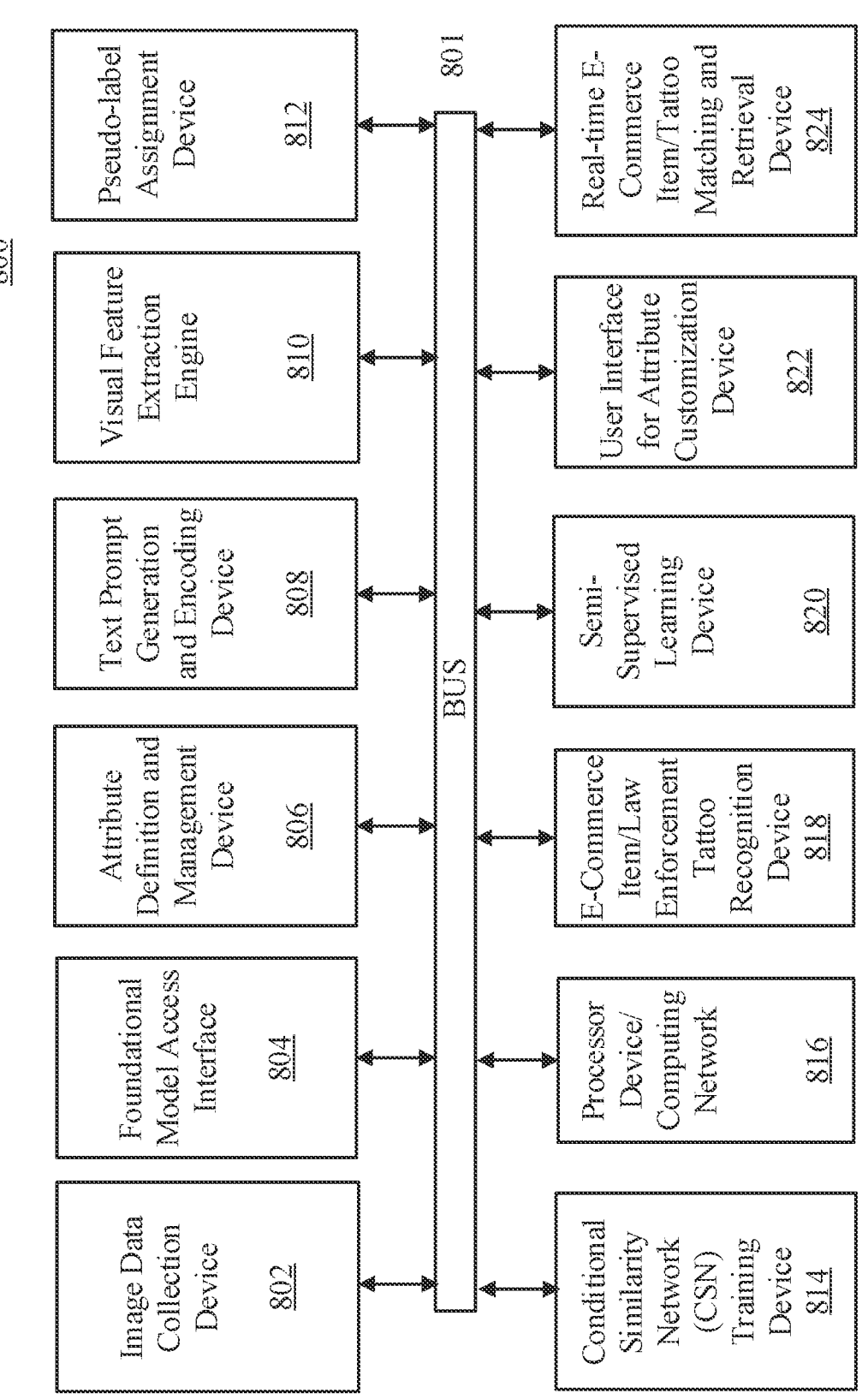
FIG. 8 is a diagram illustratively depicting a system for determining a Notion of Similarity (NoS) between objects based on specific conditions and criteria, in accordance with aspects of the present invention.

Referring now to FIG. 8, a diagram showing a system 800 for determining a Notion of Similarity (NoS) between objects based on specific conditions and criteria is illustratively depicted in accordance with embodiments of the present invention.

In various embodiments, in block 802, the system can be equipped with a module configured for collecting or receiving an unlabeled dataset of images. This module is responsible for aggregating visual data from various sources, ensuring a diverse and comprehensive collection of images for analysis and processing. Block 804 introduces an interface for accessing a foundational vision-language model, such as CLIP, which has been pre-trained on a vast corpus of image-text pairs. This interface facilitates the interaction between the system and the model, enabling the system to leverage the model's capabilities for understanding and interpreting complex visual and textual data.

In block 806, the system features a management unit dedicated to defining and handling a set of attributes, each with multiple possible values. This unit allows for the dynamic establishment of notions of similarity (NoS) based on specific user-defined conditions and criteria, crucial for generating meaningful pseudo-labels. Block 808 outlines a component for generating text prompts for each attribute value using a predefined template, followed by encoding these prompts with the text encoder of the foundational model. This process transforms the attribute values into a format compatible with the model's linguistic understanding, facilitating effective comparison with visual data.

In block 810, the system incorporates an engine for processing each image through the vision encoder of the foundational model to extract visual features. This engine analyzes the visual content of images, preparing them for subsequent comparison with encoded text prompts. Block 812 describes the mechanism for comparing extracted visual features against encoded text prompts to assign a pseudo-label for each attribute to each image. This mechanism effectively matches visual data with linguistic concepts, resulting in the generation of pseudo-labels that reflect the conditional similarities identified.

In block 814, the system includes a facility for training a Conditional Similarity Network (CSN) using the images annotated with pseudo-labels. This training process adapts the CSN to accurately identify and match images based on the established notions of similarity. Block 816 represents a processor device and computing network for executing various functionality of the system 800 for local and/or remote processing of data, in accordance with aspects of the present invention. The processor device can be operatively coupled to a bus 801 for executing functionality of the system, in accordance with aspects of the present invention.

Block 818 introduces a specialized system designed for e-commerce and law enforcement applications, particularly for item and tattoo recognition, comparison, and matching. This system utilizes the conditional similarity model to identify and match e-commerce items and/or tattoos within extensive datasets, supporting the search for particular e-commerce items with specific characteristics and/or associations with gangs or criminal activities based on user-defined notions of similarity. Block 820 incorporates a module dedicated to enhancing the Conditional Similarity Network (CSN) training using a semi-supervised learning approach. This module leverages a small percentage of labeled data (e.g., 1% of the dataset) to refine the pseudo-label generation process, significantly improving the model's accuracy and efficiency in identifying and matching images based on conditional similarity.

In block 822, the system features a user interface designed for the dynamic definition and customization of attributes and notions of similarity (NoS). This interface allows users, including domain experts and end-users, to specify and modify the conditions and criteria used for generating pseudo-labels, thereby tailoring the system's output to specific application needs, such as e-commerce searches or law enforcement investigations. Block 824 details a real-time e-commerce item and tattoo matching and retrieval system, utilizing the conditional similarity model specifically for e-commerce applications and law enforcement tattoo recognition. This system provides tools for real-time searching through comprehensive e-commerce item datasets and/or law enforcement tattoo datasets to identify potential matches based on a variety of user-defined notions of similarity, including abstract concepts and specific symbols or meanings. It supports the identification of items and tattoos that share particular attributes but differ in appearance, enhancing the effectiveness of searching for particular e-commerce items and criminal investigations and gang association analyses, in accordance with aspects of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment," as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A system for matching one or more images using conditional similarity pseudo-labels, comprising:

a non-transitory computer-readable medium operatively coupled to a processor device, the processor being configured for:

analyzing an unlabeled dataset of images;

accessing a foundational vision-language model trained on a plurality of image-text pairs;

defining a set of attributes each including multiple possible values for generating pseudo-labels based on notions of similarity (NoS);

generating text prompts for each attribute value using a prompt template and encoding the text prompts using a text encoder of the foundational model;

processing each image in the unlabeled dataset of images through a vision encoder of the foundational model to obtain visual features;

comparing the visual features against encoded text prompts to assign a pseudo-label for each attribute for each image; and training a Conditional Similarity Network (CSN) with the pseudo-labeled images to generate a conditional similarity model.

2. The system of claim 1, wherein the foundational vision-language model is Contrastive Language-Image Pre-Training (CLIP).

3. The system of claim 1, wherein the set of attributes includes specific user-defined conditions and criteria.

4. The system of claim 1, wherein the prompt template comprises a prefix, an attribute value, and a suffix, and triplets are generated from the pseudo-labeled images for training the CSN.

5. The system of claim 1, wherein the CSN is further trained using a semi-supervised learning approach with a small percentage of labeled data, the small percentage of labeled data being 1% of the dataset.

6. The system of claim 1, wherein the processor is further configured for refining product search capabilities on e-commerce platforms based on user-defined attributes for retrieval of products that align with specific user preferences and requirements using the conditional similarity model.

7. The system of claim 1, wherein the processor is further configured for:

identifying and matching one or more tattoos of interest using the conditional similarity model within law enforcement systems for tattoo recognition;

real-time searching through comprehensive law enforcement tattoo datasets to identify associations with gangs or criminal activities based on user-defined notions of similarity, beyond mere visual resemblance; and recognizing tattoos that share particular attributes but differ in appearance from the one or more tattoos of interest by matching one or more of the tattoos of interest to one or more tattoos from the tattoo datasets based on customizable attributes specified by end users, the attributes being related to specific symbols or meanings.

8. A computer-implemented method for matching one or more images using conditional similarity pseudo-labels, comprising:

analyzing an unlabeled dataset of images;

accessing a foundational vision-language model trained on a plurality of image-text pairs;

defining a set of attributes each including multiple possible values for generating pseudo-labels based on notions of similarity (NoS);

generating text prompts for each attribute value using a prompt template and encoding the text prompts using a text encoder of the foundational model;

processing each image in unlabeled the dataset of images through a vision encoder of the foundational model to obtain visual features;

comparing the visual features against encoded text prompts to assign a pseudo-label for each attribute for each image; and training a Conditional Similarity Network (CSN) with the pseudo-labeled images to generate a conditional similarity model.

9. The method of claim 8, wherein the foundational vision-language model is Contrastive Language-Image Pre-Training (CLIP).

10. The method of claim 8, wherein the set of attributes includes specific user-defined conditions and criteria.

11. The method of claim 8, wherein the prompt template comprises a prefix, an attribute value, and a suffix, and triplets are generated from the pseudo-labeled images for training the CSN.

12. The method of claim 8, wherein the CSN is further trained using a semi-supervised learning approach with a small percentage of labeled data, the small percentage of labeled data being 1% of the dataset.

13. The method of claim 8, further comprising refining product search capabilities on e-commerce platforms based on user-defined attributes for retrieval of products that align with specific user preferences and requirements using the conditional similarity model.

14. The method of claim 8, further comprising:

identifying and matching one or more tattoos of interest using the conditional similarity model within law enforcement systems for tattoo recognition;

real-time searching through comprehensive law enforcement tattoo datasets to identify associations with gangs or criminal activities based on user-defined notions of similarity, beyond mere visual resemblance; and recognizing tattoos that share particular attributes but differ in appearance from the one or more tattoos of interest by matching one or more of the tattoos of interest to one or more tattoos from the tattoo datasets based on customizable attributes specified by end users, the attributes being related to specific symbols or meanings.

15. A non-transitory computer-readable storage medium comprising a computer-readable program for matching one or more images using conditional similarity pseudo-labels, wherein the computer-readable medium when executed on a computer causes the computer to perform a method, comprising:

analyzing an unlabeled dataset of images;

accessing a foundational vision-language model trained on a plurality of image-text pairs;

defining a set of attributes each including multiple possible values for generating pseudo-labels based on notions of similarity (NoS);

generating text prompts for each attribute value using a prompt template and encoding the text prompts using a text encoder of the foundational model;

processing each image in the unlabeled dataset of images through a vision encoder of the foundational model to obtain visual features;

comparing the visual features against encoded text prompts to assign a pseudo-label for each attribute for each image; and training a Conditional Similarity Network (CSN) with the pseudo-labeled images to generate a conditional similarity model.

16. The non-transitory computer-readable medium of claim 15, wherein the foundational vision-language model is Contrastive Language-Image Pre-Training (CLIP).

17. The non-transitory computer-readable medium of claim 15, wherein the set of attributes includes specific user-defined conditions and criteria.

18. The non-transitory computer-readable medium of claim 15, wherein the prompt template comprises a prefix, an attribute value, and a suffix, and triplets are generated from the pseudo-labeled images for training the CSN.

19. The non-transitory computer-readable medium of claim 15, further comprising training the CSN using a semi-supervised learning approach with a small percentage of labeled data, the small percentage of labeled data being 1% of the dataset.

20. The non-transitory computer-readable medium of claim 15, further comprising:

identifying and matching one or more tattoos of interest using the conditional similarity model within law enforcement systems for tattoo recognition;

real-time searching through comprehensive law enforcement tattoo datasets to identify associations with gangs or criminal activities based on user-defined notions of similarity, beyond mere visual resemblance; and recognizing tattoos that share particular attributes but differ in appearance from the one or more tattoos of interest by matching one or more of the tattoos of interest to one or more tattoos from the tattoo datasets based on customizable attributes specified by end users, the attributes being related to specific symbols or meanings.

\* \* \* \* \*